(12) United States Patent
Yano

(10) Patent No.: US 7,342,704 B2
(45) Date of Patent: Mar. 11, 2008

(54) LIGHT ADJUSTER AND LAMINATED GLASS

(75) Inventor: Yuichi Yano, Ichihara (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 129 days.

(21) Appl. No.: 11/255,245

(22) Filed: Oct. 21, 2005

(65) Prior Publication Data

US 2006/0103614 A1    May 18, 2006

Related U.S. Application Data

(63) Continuation of application No. PCT/JP03/17041, filed on Dec. 26, 2003.

(30) Foreign Application Priority Data

Apr. 21, 2003    (JP) .............................. 2003-115808

(51) Int. Cl.
G02B 26/02    (2006.01)
(52) U.S. Cl. ..................... 359/227; 52/171.3
(58) Field of Classification Search ........ 359/265–275, 359/227, 228; 345/105, 107; 349/16, 27, 349/86, 88, 89, 125, 129; 52/171.13
See application file for complete search history.

(56) References Cited

U.S. PATENT DOCUMENTS 5,486,937 A    1/1996 Yano et al.

6,285,435 B1 *    9/2001 Inoue et al. ................. 349/189

FOREIGN PATENT DOCUMENTS

| EP | 05778 827 A | 1/1994 |
|---|---|---|
| JP | 58-501631 | 9/1983 |
| JP | 3-116019 | 5/1991 |
| JP | 11-353907 A | 12/1999 |

\* cited by examiner

*Primary Examiner*—Ricky Mack
*Assistant Examiner*—Tuyen Tra
(74) *Attorney, Agent, or Firm*—Cohen Pontani Lieberman & Pavane LLP

(57) ABSTRACT

A light adjuster according to which the wavelength dependence of the transmissivity when a voltage is not being applied can be reduced, and a laminated glass containing the light adjuster. The light adjuster 100 is comprised of a single liquid crystal layer 104, a pair of transparent electrically conductive films 106a and 106b having the liquid crystal layer 104 therebetween, and a pair of PET films 105a and 105b bonded respectively to outer surfaces of the pair of transparent electrically conductive films. The liquid crystal layer 104 is comprised of a transparent polymer film 101 that is made of a latex and has a large number of voids therein. Each of the voids is filled with nematic liquid crystalline rod-like molecules 102, thus forming a liquid crystal capsule 103. When the light adjuster 100 is in a non-transparent state, the transmissivity exhibits no sudden increase over a wavelength region from 380 nm to 780 nm, the difference between the maximum transmissivity and the minimum transmissivity over this wavelength region being not more than 3%.

8 Claims, 4 Drawing Sheets

LIGHT ADJUSTER AND LAMINATED GLASS

This application is a U.S. Continuation Application under 35 USC 371 of International Application PCT/JP2003/017041 filed 26 Dec. 2003.

TECHNICAL FIELD

The present invention relates to a light adjuster having a liquid crystal material therein, and a laminated glass containing the light adjuster, and in particular relates to a light adjuster that enables visual field control, and a laminated glass containing the light adjuster.

BACKGROUND ART

Hitherto, electrochromic devices (hereinafter referred to as "EC devices") have been known as devices such as light adjusters having a light adjusting capability of enabling the transmissivity to be freely adjusted (hereinafter referred to as "light adjusting devices"). Such an EC device is, for example, made from a material that undergoes a spectral change upon an electrochemical redox reaction, such as tungsten oxide or prussian blue, and controls the amount of light transmitted by absorbing light. However, because such an EC device is current driven, if the EC device is made to have a large area, then a large voltage drop arises, the response speed drops markedly, and degradation of constituent materials due to electrochemical changes and so on occurs during prolonged passing of a current; such an EC device thus cannot be used as a light adjuster that is required to be durable.

In recent years, voltage driven light adjusting devices have thus come to be used as light adjusters instead of such current driven EC devices. For example, nematic curvilinear aligned phase (NCAP) liquid crystal light adjusters are known as such voltage driven light adjusting devices. Such a nematic liquid crystal light adjuster is made from a liquid crystal material, and has excellent durability, and moreover can easily be made to have a large area (see, for example, Published Japanese Translation of PCT Application (Kohyo) No. S58-501631).

In general, such a light adjuster is comprised of a liquid crystal layer having a light adjusting function in which a plurality of voids are filled with liquid crystals, and a pair of PET films that sandwich the liquid crystal layer therebetween; transparent electrically conductive films are provided on respective facing surfaces of the PET films so as to be bonded to the liquid crystal layer, and a voltage is applied to the liquid crystal layer via this pair of transparent electrically conductive films. The liquid crystal layer is made of a transparent polymer film having a large number of voids therein, and each void is filled with liquid crystals so as to form a liquid crystal capsule.

According to such a light adjuster, when a voltage is not being applied, the liquid crystal molecules line up along the curved wall surfaces of the liquid crystal capsules, i.e. are not arranged along the direction of travel of transmitted light transmitted through the liquid crystal capsules; the optical path of the transmitted light thus meanders around, and incident light is scattered at boundary layers between the liquid crystal capsules and the polymer film, and hence the liquid crystal layer becomes translucent. On the other hand, when a voltage is applied, the liquid crystal molecules align to the direction of the electric field produced, and at this time, due to the liquid crystal layer being made from a material such that the ordinary refractive index $n_o$ of the liquid crystal molecules matches the refractive index $n_p$ of the polymer film, it becomes such that boundary layers between the liquid crystal capsules and the polymer film do not exist optically, and hence transmitted light incident on the liquid crystal layer can be transmitted unhindered, whereby the liquid crystal layer becomes transparent.

Due to the above principle, the light adjuster has a visual field controlling capability of blocking the visual field through scattering of incident light when a voltage is not being applied, and securing the visual field through allowing incident light to be transmitted unhindered when a voltage is being applied.

Due to this visual field controlling capability, such a light adjuster is suitable for use as a partition either alone or in the form of a laminated glass sandwiched between a plurality of glass plates; in recent years, however, there has been an increase in cases in which such a light adjuster is used as a projection screen.

An example in which such a light adjuster is used as a projection screen is a display window having a rear projector provided thereinside. According to such a light adjuster, when the light adjuster becomes transparent due to application of a voltage to the liquid crystal layer, merchandise displayed inside the display window is made visible, and when the light adjuster becomes translucent (non-transparent) due to a voltage not being applied to the liquid crystal layer, an image advertising the merchandise or the like projected onto the window from the rear projector provided inside the display window is cast out.

Here, a small degree of scattering remaining when the light adjuster is transparent is referred to as "haze". In the case of use as a display window as described above, it is required to reduce the haze when transparent. Furthermore, a display window has a large opening area, and hence as well as reducing the haze when transparent, it is also required for the dependence of the haze on the viewing angle to be low.

Moreover, so that such a light adjuster can function as a projection screen onto which is cast an image projected from a rear projector or the like, it is also required to reduce the wavelength dependence of the transmissivity in a non-transparent state.

It is known that the dependence of the haze on the viewing angle when the light adjuster is made transparent using a sinusoidal power source can be reduced by using liquid crystals having a low birefringence (hereinafter referred to as "Δn") (see, for example, Japanese Laid-open Patent Publication (Kokai) No. H03-116019).

However, for such a light adjuster, even though the dependence of the haze on the viewing angle in the transparent state can be reduced by using liquid crystals having a low birefringence Δn, the wavelength dependence of the transmissivity in the non-transparent state cannot be reduced; for example, there is a problem that light of long wavelength is preferentially transmitted, and hence the projection screen has a reddish tinge.

It is an object of the present invention to provide a light adjuster and a laminated glass which are capable of reducing the wavelength dependence of the transmissivity when a voltage is not being applied.

DISCLOSURE OF THE INVENTION

To attain the above object, in a first aspect of the present invention, there is provided a light adjuster comprising a liquid crystal layer having a plurality of voids therein, each of the voids being filled with a liquid crystal material, a pair of substrates that sandwich the liquid crystal layer therebetween, at least one of the substrates being transparent, and transparent electrically conductive films provided on respective facing surfaces of the substrates, characterized in that a variation in transmissivity over a predetermined wavelength region of incident light incident on the light adjuster is set to be within a predetermined range.

In the first aspect of the present invention, for the light adjuster, preferably, the variation in the transmissivity over the predetermined wavelength region is a difference between a maximum transmissivity and a minimum transmissivity over a wavelength region from 380 nm to 780 nm, the difference being not more than 3%.

In the first aspect of the present invention, for the light adjuster, preferably, the liquid crystal material has a birefringence $\Delta n$ of not less than 0.12, and a product of a diameter D1 of a void converted in terms of a diameter of a sphere having a same volume as the voids and the birefringence $\Delta n$ is in a range of 0.24 $\mu m \leq D1*\Delta n \leq 0.32$ $\mu m$.

To attain the above object, in a second aspect of the present invention, there is provided a laminated glass comprising a light adjuster having a liquid crystal layer having a plurality of voids therein, each of the voids being filled with a liquid crystal material, a pair of substrates that sandwich the liquid crystal layer therebetween, at least one of the substrates being transparent, and transparent electrically conductive films provided on respective facing surfaces of the substrates, characterized in that a variation in transmissivity over a predetermined wavelength region of incident light is set to be within a predetermined range.

In the second aspect of the present invention, for the laminated glass, preferably, the variation in the transmissivity over the predetermined wavelength region is a difference between a maximum transmissivity and a minimum transmissivity over a wavelength region from 380 nm to 780 nm, the difference being not more than 3%.

In the second aspect of the present invention, for the laminated glass, preferably, the liquid crystal material has a birefringence $\Delta n$ of not less than 0.12, and a product of a diameter D1 of a void converted in terms of a diameter of a sphere having a same volume as the voids and the birefringence $\Delta n$ is in a range of 0.24 $\mu m \leq D1*\Delta n \leq 0.32$ $\mu m$.

BEST MODE FOR CARRYING OUT THE INVENTION

Figure 1:
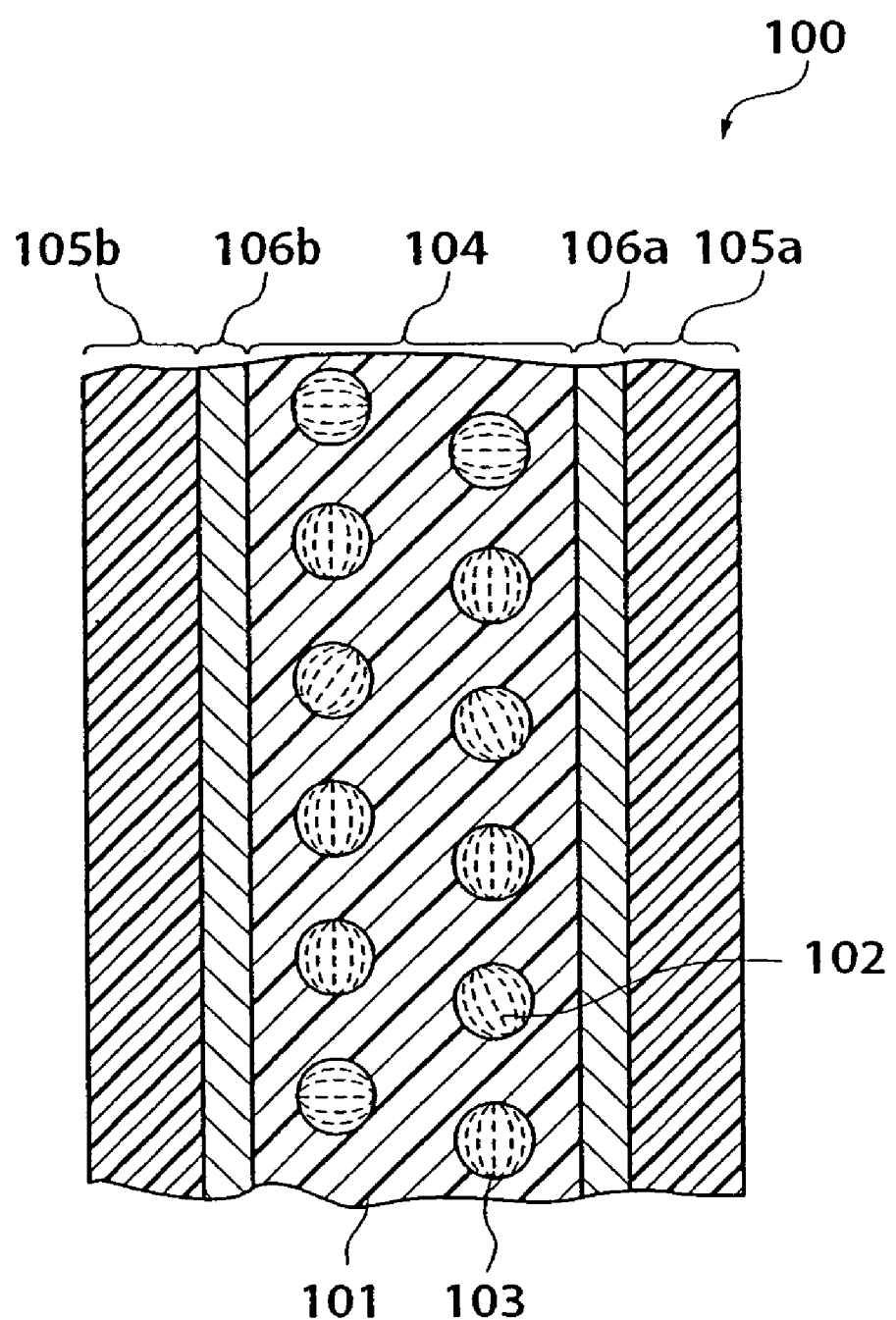
FIG. 1 is a sectional view of a light adjuster according to an embodiment of the present invention.

A light adjuster according to an embodiment of the present invention will now be described with reference to the drawings.

First, a detailed description will be given of techniques for reducing the wavelength dependence of the transmissivity and the scattering angle dependence of the transmissivity when the light adjuster according to the present invention is non-transparent.

First, the scattering angle dependence of the transmissivity is reduced using the following technique.

For the light adjuster in the non-transparent state, the greater the birefringence $\Delta n$ of the liquid crystals, the lower the difference tends to be between the transmissivity at a large scattering angle, and the transmissivity in a direction parallel to the incident light (the normal direction).

To reduce the scattering angle dependence of the transmissivity, the birefringence $\Delta n$ must thus be set to not less than a predetermined value. Here, if the birefringence $\Delta n$ is made to be not less than 0.12, then the scattering angle dependence of the transmissivity can be reduced to a sufficient level for securing functioning as a projection screen.

To reduce the scattering angle dependence of the transmissivity of the light adjuster, the birefringence $\Delta n$ is thus preferably made to be not less than 0.12.

Moreover, the wavelength dependence of the transmissivity is reduced using the following technique.

For the light adjuster in the non-transparent state, the greater the diameter D1 of a capsule converted in terms of the diameter of a sphere having the same volume as the liquid crystal capsules filled with the liquid crystals (hereinafter referred to as the "sphere-converted diameter"), the less readily incident light is diffracted. As a result, the greater the sphere-converted diameter D1, the less readily the incident light is transmitted through the light adjuster.

To reduce the wavelength dependence of the transmissivity of the light adjuster, the sphere-converted diameter D1 must thus be set to not less than a predetermined value, thus keeping down the variation in the transmissivity over, for example, the visible region to within a predetermined range, thereby preventing light of long wavelength from being preferentially transmitted.

The variation in the transmissivity is the difference between the maximum transmissivity and the minimum transmissivity over a predetermined wavelength region. The transmissivity generally increases with increasing wavelength, and hence the variation in the transmissivity over a region from 380 nm to 780 nm is the difference between the transmissivity at 780 nm and the transmissivity at 380 nm.

Specifically, if the sphere-converted diameter D1 is not less than 1.5 $\mu m$, then the variation in the transmissivity over the visible region from 380 nm to 780 nm can be kept down to not more than 3%, and hence the wavelength dependence of the transmissivity can be reduced.

Furthermore, there is a correlation between the sphere-converted diameter D1 and the birefringence $\Delta n$; to reduce the birefringence $\Delta n$, the set value of the sphere-converted diameter D1 must be increased. Specifically, in the case that the birefringence $\Delta n$ is 0.16, the sphere-converted diameter D1 must be set in a range of 1.5 $\mu m$ to 2.0 $\mu m$, whereas in the case that the birefringence $\Delta n$ is 0.12, the sphere-converted diameter D1 must be set in a range of 2.0 $\mu m$ to 2.7 $\mu m$.

To reduce the wavelength dependence of the transmissivity, the product of the sphere-converted diameter D1 and the birefringence $\Delta n$ must thus be set in a range of 0.24 $\mu m$ to 0.32 $\mu m$. As a result, the wavelength dependence of the transmissivity can be reduced to a sufficient level for securing functioning as a projection screen.

To reduce the wavelength dependence of the transmissivity of the light adjuster, the product of the sphere-converted diameter D1 and the birefringence $\Delta n$ is thus preferably set in a range of 0.24 $\mu m$ to 0.32 $\mu m$.

FIG. 1 is a sectional view of the light adjuster according to the embodiment of the present invention.

In FIG. 1, the light adjuster 100 is comprised of a liquid crystal layer 104 comprised of a transparent polymer film 101 made of a latex having a plurality of voids therein and liquid crystal capsules 103 formed through the voids being filled with nematic liquid crystalline rod-like molecules 102, a pair of PET films 105a and 105b that sandwich the liquid crystal layer 104 therebetween, and transparent electrically conductive films 106a and 106b that are provided on respective facing surfaces of the pair of PET films 105a and 105b. In the light adjuster 100, the pair of transparent electrically conductive films 106a and 106b apply a voltage to the liquid crystal layer 104.

According to the light adjuster 100, when a voltage is not being applied to the liquid crystal layer 104, the nematic liquid crystalline rod-like molecules 102 line up along the curved wall surfaces of the liquid crystal capsules 103, i.e. are not arranged along the direction of travel of transmitted light transmitted through the liquid crystal capsules 103; the optical path of the transmitted light thus meanders around, and incident light is scattered at boundary layers between the liquid crystal capsules 103 and the polymer film 101, and hence the liquid crystal layer 104 becomes translucent. On the other hand, according to the light adjuster 100, when a voltage is applied to the liquid crystal layer 104, the nematic liquid crystalline rod-like molecules 102 align to the direction of the electric field produced, and at this time, due to the liquid crystal layer 104 being made from a material such that the ordinary refractive index no of the nematic liquid crystalline rod-like molecules 102 matches the refractive index $n_p$ of the polymer film 101, it becomes such that boundary layers between the liquid crystal capsules 103 and the polymer film 101 do not exist optically, and hence transmitted light incident on the liquid crystal layer 104 can be transmitted unhindered, whereby the liquid crystal layer 104 becomes transparent.

Due to the above principle, the light adjuster 100 has a visual field controlling capability of blocking the visual field through scattering of incident light when a voltage is not being applied, and securing the visual field through allowing incident light to be transmitted unhindered when a voltage is being applied.

Moreover, in the light adjuster 100, the nematic liquid crystals have a birefringence Δn of not less than 0.12, and the product of the sphere-converted diameter D1 of the liquid crystal capsules 103 and the birefringence Δn of the nematic liquid crystals is in a range of 0.24 μm≦D1*Δn≦0.32 μm.

Next, a description will be given of a method of manufacturing the light adjuster 100.

Figure 2:
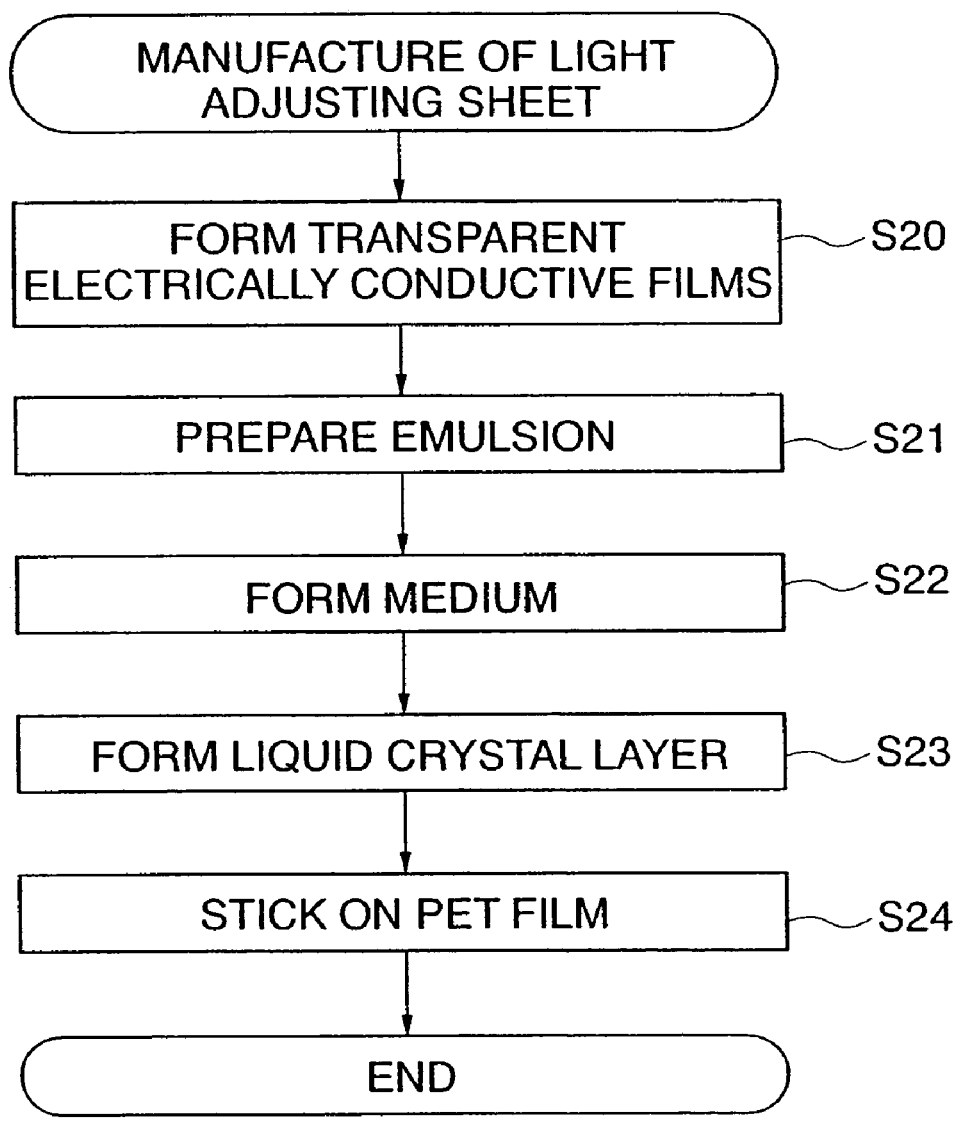
FIG. 2 is a flowchart of a method of manufacturing the light adjuster 100 shown in FIG. 1.

FIG. 2 is a flowchart of the method of manufacturing the light adjuster 100 shown in FIG. 1.

As shown in FIG. 2, first, a transparent electrically conductive film 106a or 106b made of ITO is formed on one surface of each of 175 μm-thick PET films 105a and 105b (step S20).

Next, nematic liquid crystals and an aqueous phase are mixed together to prepare an emulsion, and the prepared emulsion is added to a latex, or else nematic liquid crystals and a latex are directly mixed together to prepare an emulsion. At this time, to form stable liquid crystal particles, it is preferable to add a surfactant to the emulsion. The mixing together of the nematic liquid crystals and the aqueous phase or the latex is carried out using a mixer such as a blender or a colloid mill (step S21). The sphere-converted diameter (D1) of the liquid crystal capsules 103 can be controlled to a desired value through the rotational speed of the mixer. Here, the sphere-converted diameter D1 is set to 2.0 μm; in the case that the sphere-converted diameter D1 is 2.0 μm, the birefringence Δn of the nematic liquid crystals may have a value of from 0.12 to 0.16.

A crosslinking agent for crosslinking the latex in the prepared emulsion is then further added to form a medium (step S22). The amount added of the crosslinking agent is set, in correspondence with the amount of solids in the latex, to be an amount capable of crosslinking all of the latex in terms of solids.

The medium thus formed is then applied onto the transparent electrically conductive film 106a using a suitable means such as a knife blade, and the applied medium is then dried, whereby crosslinking of the latex by the crosslinking agent is made to proceed, and hence a liquid crystal layer 104 is formed (step S23).

Next, the PET film 105b is stuck onto the liquid crystal layer 104 thus formed such that the transparent electrically conductive film 106b contacts the liquid crystal layer 104 (step S24), thus completing the manufacturing process.

According to the present embodiment, the nematic liquid crystals have a birefringence Δn of not less than 0.12, and moreover the product of the sphere-converted diameter D1 of the liquid crystal capsules 103 and the birefringence Δn of the nematic liquid crystals is in a range of 0.24 μm≦D1*Δn≦0.32 μm. As a result, the wavelength dependence of the transmissivity and the scattering angle dependence of the transmissivity when the light adjuster 100 is in a non-transparent state can be reduced to a sufficient level for securing functioning of a projection screen using the light adjuster 100.

The liquid crystals in the light adjuster 100 according to the present embodiment are not limited to being nematic liquid crystals as described above, but rather may instead be cholesteric liquid crystals or smectic liquid crystals.

In the light adjuster 100 according to the present embodiment, instead of the PET films, for example plastic films or glass sheets each having an ITO film or a tin oxide ($SnO_2$) film formed on a surface thereof may be used.

For the polymer film in the light adjuster 100 according to the present embodiment, a material of any type, inorganic or organic, can be used insofar as this material has a refractive index n matching the ordinary refractive index $n_o$ of the nematic liquid crystal molecules, and is able to hold the nematic liquid crystals in the form of a plurality of capsules.

Moreover, it goes without saying that the light adjuster 100 described above can be used in the form of a laminated glass sandwiched between a plurality of glass plates, and that the effects described above can also be produced in this case.

Next, an example of the present invention will be described in detail.

EXAMPLE 0.5 wt % of an IGEPAL CO-610 surfactant (made by General Aniline & Filma Inc.) was added to ZLI-1840 liquid crystals (made by Merck & CO., Inc, Δn=0.143), the liquid crystals to which the surfactant had been added were added to Neorez R-967 (made by AstraZeneca PLC) containing 40 wt % of latex particles such that the liquid crystal proportion was 0.62, and then stirring was carried out for 10 minutes at 10,000 revs using a homogenizer, thus obtaining an emulsion. Next, while gently mixing the emulsion, a CX-100 crosslinking agent (made by AstraZeneca PLC) was added in a proportion of 3 wt % to the emulsion. The emulsion to which the crosslinking agent had been added was then applied onto an ITO film-possessing PET film using a doctor blade, and drying was carried out.

After the applied emulsion had been dried, another ITO film-possessing PET film was stuck onto the emulsion, thus obtaining a light adjuster. The thickness of the liquid crystal layer in the light adjuster was 20 μm.

For the above light adjuster, the sphere-converted diameter D1 of the liquid crystal capsules was 2.0 μm, and D1*Δn was 0.286 μm.

Using the light adjuster, the transmissivity over a wavelength region from 380 nm to 800 nm when the light adjuster was in the non-transparent state was measured using a MCPD-1000 (28C) multifunctional multichannel spectrophotometer (made by Otsuka Electronics Co., Ltd.). The results are shown by the dashed line on FIG. 3, described below.

Moreover, the transmissivity at scattering angles from −50° to 50° was measured. The ratio of the transmissivity at each scattering angle to the transmissivity in a normal direction (0°) (hereinafter referred to as the "scattering transmissivity ratio") is shown by the dashed line on FIG. 4, described below.

COMPARATIVE EXAMPLE

A light adjuster was obtained using the same manufacturing method as for the light adjuster of the Example described above, except that the rotational speed of the homogenizer was set to a different value in the Example. For the light adjuster obtained, the sphere-converted diameter D1 of the liquid crystal capsules was 1.0 μm, and D1*Δn was 0.143 μm.

Using this light adjuster, the transmissivity over a wavelength region from 380 nm to 800 nm was measured as for the Example described above. The results are shown by the full line on FIG. 3, described below. Moreover, the transmissivity at scattering angles from −50° to 50° was measured. The scattering transmissivity ratio is shown by the full line on FIG. 4, described below.

Figure 3:
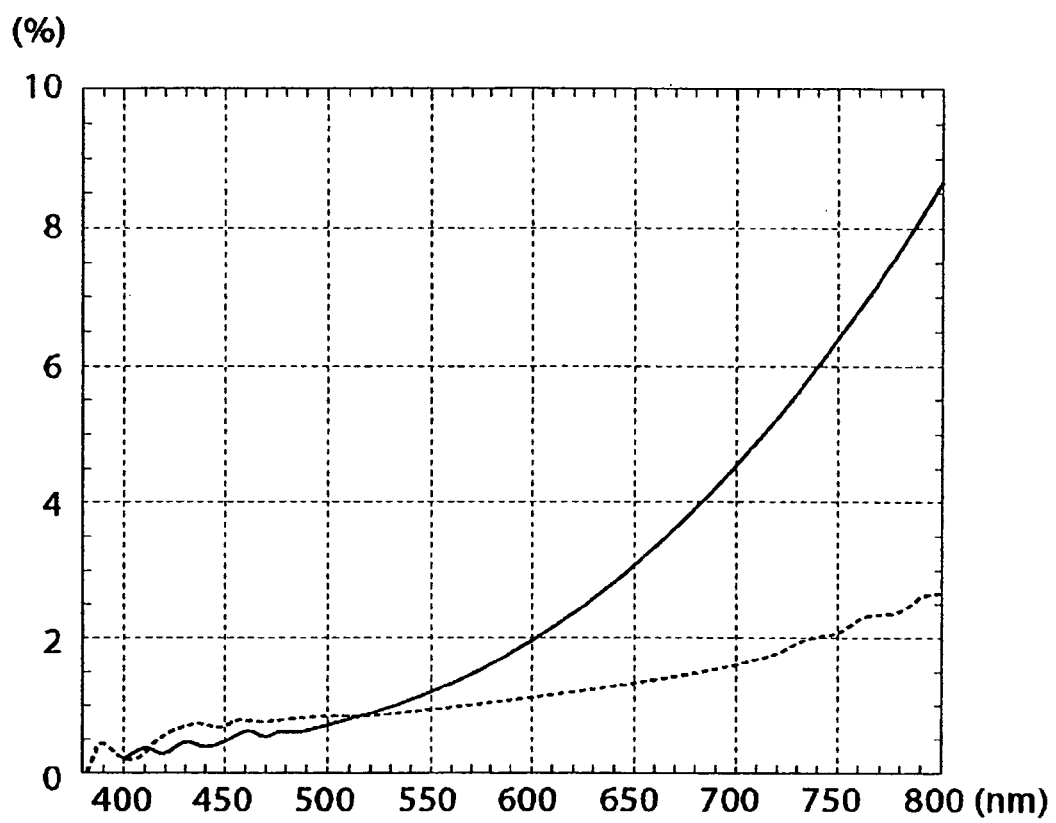
FIG. 3 is a graph showing the transmissivity of light adjusters over a wavelength region from 380 nm to 800 nm.

FIG. 3 is a graph showing the transmissivity of the light adjusters over a wavelength region from 380 nm to 800 nm.

In FIG. 3, the axis of abscissas shows the wavelength of incident light, and the axis of ordinates shows the transmissivity at each wavelength.

It can be understood from the graph of FIG. 3 that for the light adjuster of the Comparative Example, the transmissivity increases at long wavelengths, and in particular the transmissivity exceeds 8% at a wavelength of 800 nm and above, and the variation between the transmissivity at a wavelength of 380 nm and the transmissivity at a wavelength of 800 nm is also approximately 8%. As a result, in the case of using the light adjuster of the Comparative Example as a projection screen, the projection screen has a reddish tinge. On the other hand, for the light adjuster of the Example, there is no such sudden increase in the transmissivity at long wavelengths, in particular over the wavelength region from 380 nm to 780 nm, and the variation in the transmissivity, i.e. the difference between the transmissivity at a wavelength of 780 nm, which is the maximum transmissivity in this wavelength region, and the transmissivity at a wavelength of 380 nm, which is the minimum transmissivity in this wavelength region, is kept down to not more than 3%. As a result, the variation in the transmissivity can be kept down to within a range such that there are no problems in practice, i.e. the wavelength dependence of the transmissivity can be reduced. Accordingly, it was found that for a projection screen using the light adjuster of the Example, the projection screen does not have a reddish tinge, and hence the light adjuster of the Example is suitable for use as a projection screen.

Figure 4:
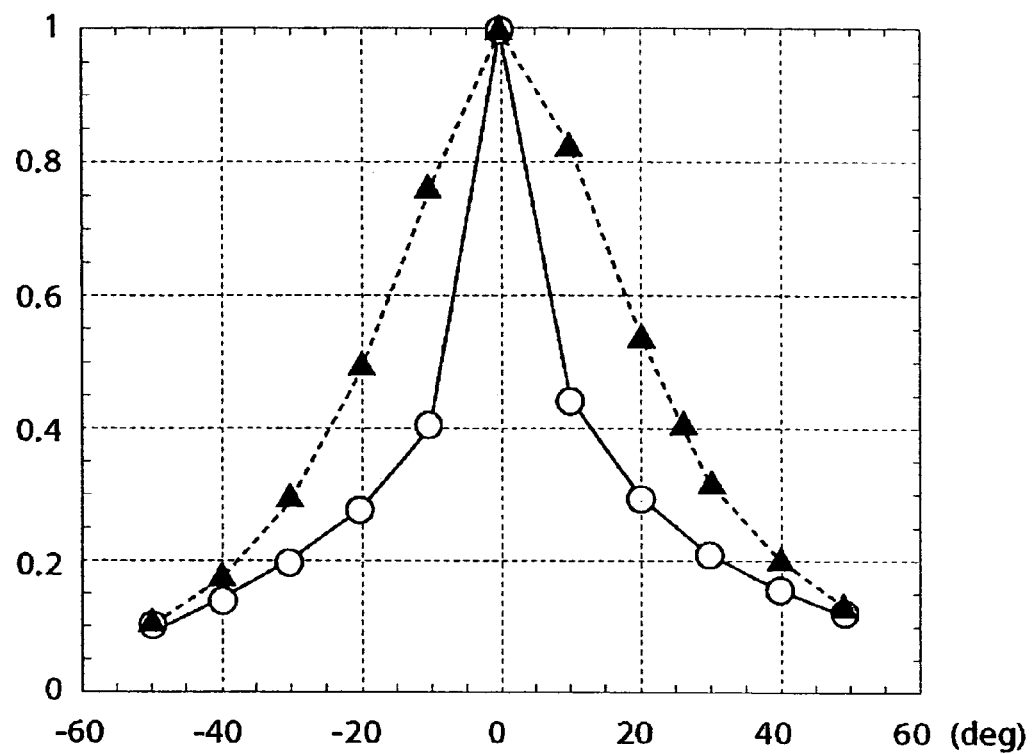
FIG. 4 is a graph showing the relationship between the transmissivity of each of the light adjusters at various scattering angles from −50° to 50°, and the transmissivity in a normal direction (0°).

FIG. 4 is a graph showing the relationship between the transmissivity of the light adjusters at various scattering angles from −50° to 50°, and the transmissivity in the normal direction (0°).

In FIG. 4, the axis of abscissas shows the scattering angle of scattered light, and the axis of ordinates shows the scattering transmissivity ratio.

It can be understood from the graph of FIG. 4 that the value of the scattering transmissivity ratio for the light adjuster of the Example exceeds the value of the scattering transmissivity ratio for the light adjuster of the Comparative Example over the scattering angle range from −50° to 50°, and hence the scattering angle dependence of the transmissivity is reduced. Accordingly, it was found that for a projection screen using the light adjuster of the Example, disturbance of the image at edges of the projection screen can be prevented when an image is projected thereon from a light source such as a rear projector.

INDUSTRIAL APPLICABILITY

As described in detail above, according to a light adjuster and a laminated glass of the present invention, the variation in transmissivity over a predetermined wavelength region of incident light incident on the light adjuster is set to be within a predetermined range. As a result, the wavelength dependence of the transmissivity in a non-transparent state can be reduced, and hence in the case of using the light adjuster as a projection screen, light of long wavelength can be prevented from being preferentially transmitted and thus the projection screen can be prevented from having a reddish tinge. The light adjuster is thus suitable for use as projection screens.

According to the light adjuster and the laminated glass of the present invention, the variation in the transmissivity over the predetermined wavelength region is the difference between the maximum transmissivity and the minimum transmissivity over a wavelength region from 380 nm to 780 nm, this difference being not more than 3%. As a result, the variation in the transmissivity over the wavelength region from 380 nm to 780 nm, which accounts for the majority of the wavelength region of incident light, can be kept down to within a range such that there are no problems in practice. The light adjuster is thus suitable for use as projection screens.

According to the light adjuster and the laminated glass of the present invention, the liquid crystal material has a birefringence Δn of not less than 0.12, and the product of the diameter D1 of a void converted in terms of the diameter of a sphere having the same volume as the voids and the birefringence Δn is in a range of $0.24\ \mu m \leq D1*\Delta n \leq 0.32\ \mu m$. As a result, the wavelength dependence of the transmissivity in the non-transparent state can be reliably reduced, and moreover the scattering angle dependence of the transmissivity can be reduced, and hence in the case of using the light adjuster in a projection screen, light of long wavelength can be reliably prevented from being preferentially transmitted and thus the projection screen can be reliably prevented from having a reddish tinge, and moreover blurring of an image at edges of the projection screen can be prevented. The light adjuster is thus suitable for use as projection screens.

The invention claimed is:

1. A light adjuster comprising:
   a liquid crystal layer having a plurality of voids therein, each of the voids being filled with a liquid crystal material;
   a pair of substrates that sandwich said liquid crystal layer therebetween, at least one of the substrates being transparent; and
   transparent electrically conductive films provided on respective facing surfaces of said substrates,
   wherein, with regard to incident light incident on the light adjuster, in a non-transparent state, a ratio of a transmissivity at a scattering angle 40° to a transmissivity in a normal direction with respect to the light adjuster is no less than 0.2.

2. The light adjuster of claim 1, wherein, in the non-transparent state, a ratio of a transmissivity at a scattering angle 30° to the transmissivity in the normal direction with respect to the light adjuster is no less than 0.3.

3. The light adjuster of claim 1, wherein, in the non-transparent state, a ratio of a transmissivity at a scattering angle 20° to the transmissivity in the normal direction with respect to the light adjuster is no less than 0.5.

4. The light adjuster of claim 1, wherein, in the non-transparent state, a ratio of a transmissivity at a scattering angle 10° to the transmissivity in the normal direction with respect to the light adjuster is no less than 0.8.

5. A laminated glass comprising a light adjuster having a liquid crystal layer with a plurality of voids therein, each of the voids being filled with a liquid crystal material, a pair of substrates that sandwich the liquid crystal layer therebetween, at least one of the substrates being transparent, and transparent electrically conductive films provided on respective facing surfaces of the substrates,
   wherein, with regard to incident light incident on said light adjuster, in a non-transparent state, a ratio of a transmissivity at a scattering angle 40° to a transmissivity in a normal direction with respect to said light adjuster is no less than 0.2.

6. The laminated glass of claim 5, wherein, in the non-transparent state, a ratio of a transmissivity at a scattering angle 30° to the transmissivity in the normal direction with respect to said light adjuster is no less than 0.3.

7. The laminated glass of claim 5, wherein, in the non-transparent state, a ratio of a transmissivity at a scaffering angle 20° to the transmissivity in the normal direction with respect to said light adjuster is no less than 0.5.

8. The laminated glass of claim 5, wherein, in the non-transparent state, a ratio of a transmissivity at a scattering angle 10° to the transmissivity in the normal direction with respect to said light adjuster is no less than 0.8.

* * * * *